Aug. 11, 1959 W. T. READ, JR 2,899,646

HIGH FREQUENCY NEGATIVE RESISTANCE DEVICE

Filed May 1, 1957 2 Sheets-Sheet 1

INVENTOR
W. T. READ, JR.
BY
Arthur J. Torsiglieri
ATTORNEY

HIGH FREQUENCY NEGATIVE RESISTANCE DEVICE

Filed May 1, 1957 2 Sheets-Sheet 2

INVENTOR
W. T. READ, JR.
BY
Arthur J. Torsiglieri
ATTORNEY

United States Patent Office 2,899,646
Patented Aug. 11, 1959

2,899,646

HIGH FREQUENCY NEGATIVE RESISTANCE DEVICE

William T. Read, Jr., Summit, N.J., assignor to Bell Telephone Laboratories, Incorporated, New York, N.Y., a corporation of New York Application May 1, 1957, Serial No. 656,239

5 Claims. (Cl. 331—96)

This invention relates to arrangements which include semiconductive devices and more particularly to negative dynamic resistance arrangements of the type disclosed in the application of W. Shockley, Serial No. 333,449, filed January 27, 1953, now Patent No. 2,794,917, and is a continuation-in-part of my application Serial No. 438,917, filed June 24, 1954.

In the aforenoted Shockley application, a semiconductive structure is disclosed wherein at certain frequencies of an applied alternating voltage the current flowing therein is shifted in phase with respect to the voltage to an extent that power is delivered from a source of direct current and added to the alternating signal. In particular, the resulting phase shift is such that the integrated current-voltage product is negative over a prescribed frequency band. This means that the structure will serve as a negative resistance within such frequency band. It will be convenient to describe a negative resistance of this kind as a negative dynamic resistance. This phase shift is realized by Shockley by a delay in the transit of charge carriers through a portion of a semiconductive structure. Charge carriers, electrons, or holes, i.e., electron deficits, were injected in these devices, for example, from a forward biased n-p junction, and then flowed across either a space charge region or a composite region consisting of a space charge portion and one in which carrier flow is by diffusion.

The present invention is directed to semiconductive, transit-time, negative dynamic resistance arrangements of structural forms which are different from those disclosed by Shockley and wherein charge carriers are injected by electrical breakdown into a space charge region.

An object of this invention is the realization of a negative dynamic resistance at frequencies at least of the order of hundreds of megacycles.

A related object is to achieve oscillations in such range of frequencies in a solid state device employing a semiconductive diode as the active element.

In accordance with the above objects, one feature of the invention is a semiconductive diode, of appropriate design, which by means of an applied bias is subjected to an electric field of sufficient magnitude to generate by electrical breakdown hole-electron parts at a localized region of the diode. The carriers generated by this field are caused to flow across a space charge layer which is in the diode adjacent their place of origin and by virtue of this movement produce a current in an associated external circuit. The diode is designed so that the space charge layer remains of substantially fixed width and the operating bias is such that in such layer the charge carrier velocity is substantially independent of fluctuations in the field intensity, whereby the charge carrier transit time is substantially independent of fluctuations in the field intensity. The diode is further operated so that there is superimposed on the operating bias an alternating voltage of a frequency which is appropriately related to the transit time of charge carriers across the space charge layer. Typically, the alternating voltage is provided by housing the semiconductive diode in a resonant cavity tuned to the desired frequency.

One embodiment of a negative dynamic resistance to be discussed in more detail comprises a semiconductive diode having a reverse biased rectifying barrier. By appropriate design, a region adjacent one edge of the space charge layer associated with the reverse biased carrier is arranged to exhibit the maximum field within the entire layer and the remainder of the space charge layer is arranged to remain of substantially fixed dimensions throughout the operation of the device. In operation, the device is biased so that the maximum field is approximately that necessary for electrical breakdown and an alternating voltage is superimposed on this bias. The magnitude of the alternating voltage is adjusted so that during a portion of the signal swing the critical field for electrical breakdown is exceeded and a pulse of hole-electron pairs is generated in the region of the space charge layer where the electric field is a maximum. The period of the applied voltage, the velocity of the charge carriers in the space charge region, and the width of the space charge region are so chosen that the current generated by the alternating voltage and flowing in the external circuit exhibits a net flow out of phase with the alternating voltage and results in a negative integrated product of signal voltage and current, i.e., a negative dynamic resistance.

There are at least two phenomena useful for the generation by electrical breakdown of hole-electron pairs at the edge of the space charge layer as is desired for the practice of the invention.

The first of these involves internal secondary emission and has been described in the literature alternatively as avalanche breakdown or carrier multiplication. This phenomenon depends on the creation at the selected edge of the space charge layer of fields of strength such that carriers moving in this field acquire enough energy to knock valence electrons into the conduction band. The multiplication rate can be regarded as a function of the peak field. At a critical field, breakdown will occur, that is, any current will be self-sustaining, every pair produced will on the average produce another pair.

The second of these phenomena involves internal field emission which has been described in the literature as a Zener current. This phenomenon depends on the fact that in narrow junctions at high enough fields electrons tunnel from the valence to the conduction band. The rate of generation is an extremely sensitive function of field strength; so, as in internal secondary emission the generation can be highly localized.

It is in accordance with the invention to make use of either of these phenomena for the generation of hole-electron pairs as is desired. Use of either of the two phenomena can be controlled by appropriate choice of the design parameters or structure. In practice, operation based on the secondary emission effect is preferred since it makes possible a higher efficiency and larger output power.

In an illustrative embodiment of the invention there is employed a semiconductive element which includes a relatively weakly doped intermediate region which is bounded at opposite ends by highly doped end regions of opposite conductivity types. Typical is an $N^+$ P I $P^+$ structure where the designation is the one familiar to workers in the art. Across the end zones there is applied a reverse bias which forms a space charge region of the intermediate P and I zones. The electric field has a maximum at the $N^+P$ edge of this space charge layer. The magnitude of the bias is adjusted to make the maximum electrical field close to that needed for electrical breakdown. Additionally, the magnitude of the alternating component superimposed on the steady bias should be such that when it is at a peak in a direction to add to the steady bias, the desired electrical breakdown occurs. The field distribution in the element is also adjusted so that the field in the main portion of the space charge layer is sufficiently high that the carriers drift therethrough at a substantially uniform velocity. The flow of carriers in the space charge region gives rise to an external current. By appropriate design of the transit time of the carriers through the space charge layer, there can be introduced a desired phase relation between an alternating voltage superimposed on the applied bias and the resulting alternating current in an external circuit. In particular, the element may be made to present a dynamic negative resistance at frequencies at which an appropriate phase relation exists. In addition to the transit time of the carriers through the space charge layer, the amount of phase shift is affected by any build-up time in the generation of the current. In particular, while the build-up time for the current is inappreciable when the generation is the result of internal field emission, the build-up time for internal secondary emission introduces a phase delay of a quarter of a cycle between the initiating alternating voltage and the resulting alternating current.

For useful operation, two criteria should be met: The field should be so distributed that hole-electron pairs are generated in a limted region of the space charge layer; and the charge carriers should move through the space charge region with an average transit time such that the integrated current voltage product is negative.

The first criterion can be met by providing an appropriate distribution of impurity centers in the semiconductive body. This will be discussed in more detail hereinafter. In general, the distribution of impurity centers must be adjusted such that the maximum electric field is reached only over a small fraction of the space charge layer. In the case of internal secondary emission, the region of maximum field is made somewhat larger than for the case of internal field emission.

As for the second criterion, in general for the integrated current voltage product to be negative there should be introduced between the external circuit current and the driving alternating voltage a phase difference of between one-half and one cycle. The optimum phase shift is determined by the duration of the interval during which current is generated. The desired phase shift is achieved by appropriate design of the width of the space charge layer to control the average transit time of the charge carriers.

In the preferred case of internal secondary emission, the current generated in the localized edge of the space charge layer is delayed approximately one-quarter the period of the alternating voltage stimulating the emission because of the build-up time of the multiplication mechanism. Moreover, since the external current is equal to the average current in the space charge region, the external current due to the curent generated locally at the edge of the space charge layer is delayed by one-half the average transit time of such current through the space charge layer. As a consequence, to achieve a total delay of one-half a cycle as is especially advantageous in this case for negative dynamic resistance, the delay of one-half the average transit time should be equal to one-quarter a period of the alternating voltage. This is satisfied when the average transit time is equal to one-half a period of the alternating voltage.

In the internal field emission case, no build-up time is required for the generation of the current at the edge of the space charge layer, and the delay is simply the average transit time of the charge carriers through the space charge layer. Accordingly, in this situation the width of the space charge layer is designed to provide an average transmit time of between one-half and one period of the alternating voltage. It is especially advantageous that the transit time be three-quarters of a period for the case where carriers are generated only at the peak of the alternating voltage swing.

The invention will be better understood from the following more detailed description taken in conjunction with the accompanying drawing in which.

Figure 1:
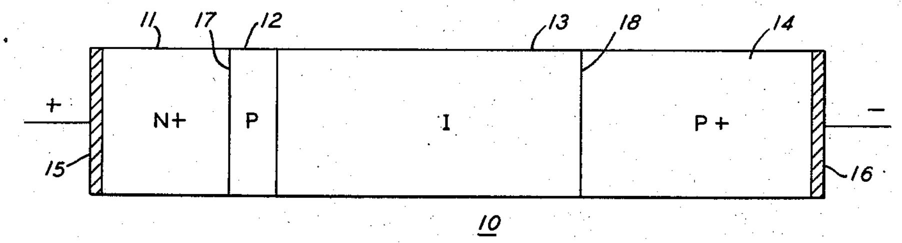
Fig. 1 shows a typical semiconductive diode which can be operated to provide a dynamic negative resistance in accordance with the invention.
Figure 2:
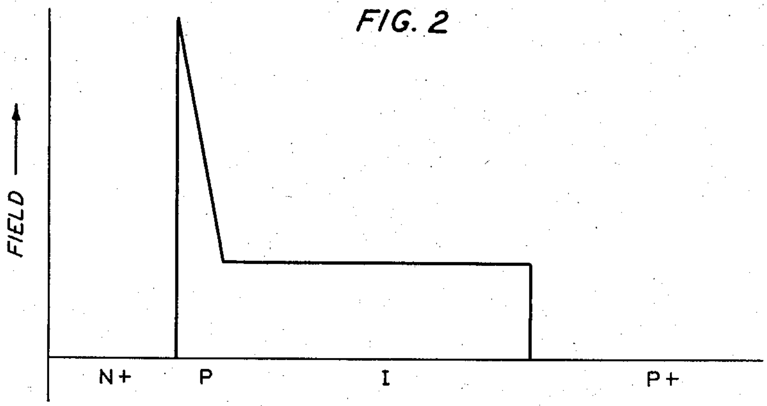
Figs. 2 and 3 show respectively the field distribution and the impurity center distribution desirable in the diode shown in Fig. 1.

With reference now to the drawing, in Fig. 1 there is depicted a semiconductor diode 10 suitable for operation in a manner to provide a dynamic negative resistance in accordance with the invention. The diode 10 comprises a semiconductive body, advantageously of monocrystalline silicon, which has an $N^+$ P I $P^+$ structure, i.e., the body includes a highly doped n-type zone 11, a p-type zone 12, a weakly doped or substantially intrinsic zone 13, and a highly doped p-type zone 14. The semiconductive diode is provided with separate low resistance connections 15, 16 to the terminal zones 11, 14 by means of which a voltage may be applied across the body. It is characteristic of the operation that the voltage is applied in a direction to bias the $N^+$ P junction in reverse, corresponding a positive polarity for electrode 15 and a negative polarity for electrode 16. The magnitude of the steady voltage applied should be well above the punch-through voltage, i.e., the voltage necessary to assure that the space charge layer in the body extends from the $N^+$ P junction 17 to the I $P^+$ junction 18 completely through zones 12 and 13. Additionally, the magnitude of the steady voltage should be such that the maximum field which occurs at $N^+$ P junction 17 should be just below the range for electron-hole pair generation by the mechanism appropriate to the particular arrangement. It will be convenient to confine the present discussion to the case where the generation occurs as a result of internal secondary emission. To this end, the maximum field should be of the order of several hundred kilovolts per centimeter. In Fig. 2 there is plotted a suitable field distribution with distance in the body. The field distribution is such that a field sufficient for carrier generation is developed only in the region near the $N^+$ P junction 17 but that the field throughout the space charge layer including zones 12 and 13 is in the range where charge carriers move with a relatively constant velocity independently of small fluctuations in the field strength. For silicon, this latter condition is met for field strengths above about five kilovolts per centimeter.

Figure 3:
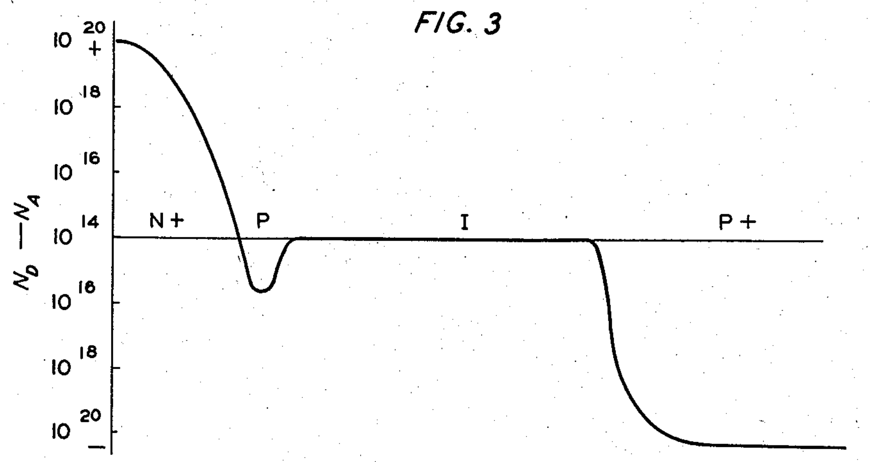

A field distribution of the kind desired may be realized by providing an appropriate distribution of impurity centers in the body. In Fig. 3 there is shown a plot of a suitable impurity center distribution through the body. More particularly there is plotted the difference in concentrations of the donor centers $N_D$ and acceptor centers $N_A$ with distance through the body. Each of the heavily doped end regions 11 and 14 has a difference of the order of $10^{20}$ centers per cubic centimeter, the zone 12 a difference which reaches a maximum of the order of $10^{16}$ centers per cubic centimeter, while the zone 13 has a difference only of the order of $10^{14}$.

It will be convenient to characterize as "intrinsic" silicon which is so lightly doped that the difference in concentrations of impurity centers is no more than of the order of $10^{14}$ centers per cubic centimeter. It is of little relevance which type of impurity center is predominant so long as the difference is less than the amount described. Viewed from a more qualitative standpoint, it will be convenient to characterize as intrinsic a semiconductive zone in which the difference in concentrations of impurity centers is sufficiently small that the variation in the electric field over the width of such zone when the steady bias is applied is less than twenty percent.

Typically the width of the zone 12 may be about .1 mil and that of zone 13 about 1.5 mils. The widths of the end zones 11, 14 are not critical. As a practical matter, they should be wide enough so that the body as a whole has sufficient mechanical strength for ready handling. However, too wide a width is undesirable since it is important to dissipate readily the heat generated in the space charge layer, particularly at the region of junction 17, and such heat may be most readily dissipated by providing heat sinks at the terminal connections and having these heat sinks close to the space charge layer. Typically, a width of .4 mil for zone 11, and a width of 1 mil for zone 14 are suitable.

A body having the desired distribution of impurity centers can readily be obtained using the gaseous diffusion technique now known to workers in the art. Typically, there is first prepared an intrinsic silicon crystal into which there are diffused either in simultaneous or in succeeding diffusions both acceptors and donors from gaseous states. Because of the lower diffusivity of the usual group III donor elements, it will usually be advantageous to diffuse the donor centers in first even though the acceptor centers are to penetrate deeper. It can be seen that the factor of interest, the difference in concentrations of the donor and acceptor centers, will be a result of the superposition of the two diffusions. By control of the diffusion times, the diffusion temperatures, and the vapor pressures of the diffusants in the separate diffusion steps, the desired distribution can readily be attained. There will ordinarily result from the steps hitherto described a double diffused layer over the entire surface of the intrinsic crystal. This double diffused layer may thereafter be removed selectively from all but the one surface of the body which will correspond to that to which electrode 15 is to be connected. This surface instead is masked, and a diffusion of an acceptor is carried out to form the layer 14. This step forms a single diffused layer over the exposed surface of the crystal. This layer in turn is removed except from that surface which corresponds to the one to which electrode 16 is to be connected. The electrodes 15 and 16 may be connected in the usual fashion and typically would comprise a plated film of a suitable metal. It is, of course, feasible to form the diode structure in any of the ways available to a worker in the art, and the manner of fabrication is not critical.

It seems appropriate at this point to discuss in more detail the internal secondary emission effect. This effect arises when carriers moving in the high field near the $N^+$ P junction acquire enough energy to knock valence electrons into the conduction band, thereby producing hole-electron pairs. The rate of pair production, or multiplication, is a sensitive nonlinear function of the field. At a critical value of the peak field, breakdown will occur, that is, any current is self-sustaining; every pair will on the average produce one other pair. So long as the field is above the critical value, the current will build up. When the field is below the critical value, the current will die down. The critical value of the peak field varies slightly with the width of the P region.

Since the diode is biased so that the field at the edge of the $N^+$ P junction is above the critical value during most of the positive half of the alternating voltage cycle and below the critical value during all of the negative half, the current generated builds up during all of the positive half, dying down during the negative half. Therefore, the current generated reaches a maximum value at the end of the positive half of the alternating voltage cycle, i.e., when the alternating voltage passes from a positive value to a negative value, which is one-quarter of a cycle later than when the voltage reaches its maximum. Accordingly, the build-up of the avalanche introduces a quarter cycle phase shift between voltage and current. Moreover, since the value of the avalanche current ordinarily varies by a large factor, most of the current is generated as a pulse at the end of the positive half of the alternating voltage cycle. The avalanche current tends to shut itself off because of space charge effects, i.e., the space charge of the carriers tends to reduce the peak field. If it reduces the peak field breakdown below the avalanche sustaining field too early in the cycle, the avalanche current reaches its peak prematurely and the delay between current and voltage is reduced. As a consequence, the efficiency is lowered. Thus, increasing the current through the diode increases the power only up to a certain point.

As has been mentioned above, carriers give rise to a current in the external circuit equal to the average current in the space charge layer. For the case of constant carrier velocity this is equal to the total charge in the space charge layer divided by the transit time. Accordingly for the case where the current generated may be treated as a sharp current pulse of relatively short duration, current will start to flow in the external circuit coincidently with the generation of the pulse and will continue to flow at constant amplitude for the time it takes the pulse to traverse the space charge layer. Accordingly, the external current will have a square waveform.

It is evident that to achieve a maximum negative value for the integrated current voltage product it is desirable to have the constant external current flow only during the negative half of the alternating voltage cycle. This corresponds to a delay for the external current of one-half a period of the alternating voltage. It has already been stated that there is a delay of one-half a cycle between the applied field and the external current arising from the moving carriers. In the limit of a vanishing small current, the applied field will be in phase with the applied voltage. However, as the current increases, the space charge of the current will reduce the applied field below its critical value before the middle of the voltage cycle. Consequently, the delay between the applied voltage and the external current due to the movement of charge carriers will be less than one-half of a cycle. For the conditions of optimum operation, this delay is apt to be within three-eighths and one-half a cycle.

It will now be convenient to discuss in more detail the principles of operation. When there is superimposed on the steady bias an alternating voltage, internal secondary emission occurs and electron-hole pairs are generated at the edge of junction 17. As the electron-hole pairs are generated, the electrons move immediately into the $N^+$ region and the holes move across the space charge layer. For practical purposes, the role of the electrons is not important, and their role can be ignored.

The physical picture is as follows: A current of holes $I_0$ $(t)$ is generated at the edge of the $N^+$ P junction which traverse the space charge layer moving with a constant velocity, which in silicon is about $10^7$ centimeters per second.

The holes moving across the space charge layer produce a current $I_e$ $(t)$ in the external circuit which can be shown to be equal to the average current in the layer. As the alternating voltage reaches the end of its positive half cycle, a pulse of holes is generated at the edges of the $N^+$ P junction, and a current begins to flow in the external circuit. Current continues to flow in the external circuit during the time that the pulse of holes is moving across the space charge region. Thus, on the average, the external current due to the moving holes is delayed one-half the average transmit time relative to the current generated at the edge of the $N^+$ P junction. Since the current generated is delayed by one-quarter of a cycle relative to the alternating voltage because of the build-up time, as was discussed, to achieve a total delay of one-half a period of the alternating voltage, desirable for achieving a high negative value of integrated signal current product, the delay of one-half the average transit time should be equal to one-quarter the period of the alternating voltage and, consequently, the average transit time should be equal to one-half the period of the alternating voltage.

The current which is being discussed is only the conductive current arising from the movement of holes through the space charge layer and should be distinguished from the displacement or capacitative current which charges and discharges the diode regarded as a capacitor. This displacement current is so out of phase with the voltage that it contributes nothing to the power.

Figure 4:
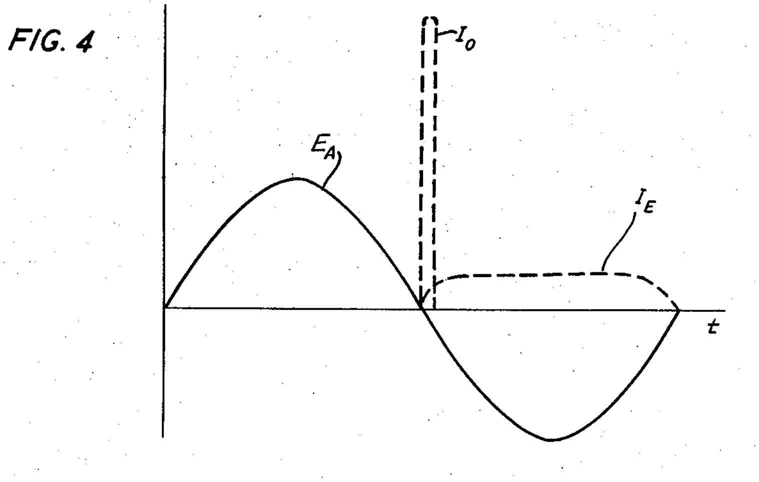
Fig. 4 shows the voltage and current relations important in the operation of the diode of Fig. 1.

In Fig. 4 there are shown superposed the alternating votage applied $E_A$, the current generated at the edge of the space charge layer $I_0$, and the current flowing in the external circuit $I_E$, for one cycle of operation in accordance with the conditions described. It is evident that the integrated product of $E_A$ and $I_E$ will have a large negative value, as is desirable. It can be seen that the negative resistance can be achieved for transit times which are longer and shorter than the one-half period which is the optimum.

The effect of carrier space charge is to reduce the delay between the current generation and the voltage so that the phase relation departs from the optimum present initially. Accordingly, the need to avoid carrier space charge imposes an upper limit on the steady bias current which may be drawn.

As has been discussed, in the useful operating range the external current approaches a square wave being very small during the positive half of the alternating voltage cycle and almost constant at a much larger value during the negative half. Since the direct current in the external circuit is the average conductive current, the amplitude of variation of the external current is approximately equal to such direct current.

For the case under discussion, the power delivered will be proportional to the product of the alternating voltage and the direct current. If the steady voltage bias is applied by a constant current generator, then the power delivered by an oscillator of this kind will be proportional to the amplitude of the alternating voltage. The energy stored in the capacitance of the diode is proportional to the square of this amplitude. This means that as the amplitude of the alternating voltage increases, the stored energy, or energy of oscillations, tends to increase faster than the amount delivered per cycle. This is the condition that a stable oscillation be possible. At the stable operating point the algebaric sum of the impedance of the diode and the impedance of the cavity is equal to zero. If the amplitude of the alternating voltage increases beyond this point, the energy delivered by the diode increases less than the energy lost to the cavity, and the amplitude decreases. Similarly, a decrease of the alternating voltage below the stable operating point also is self-correcting.

The maximum alternating voltage possible will be limited by the value of the steady bias. In particular, if the alternating voltage is too large, the field in the intrinsic zone may be reduced to zero during some part of the negative half of the alternating voltage cycle. We can insure that the carriers will travel with constant velocity during the whole of the negative half of the cycle; the amplitude of the alternating voltage advantageously should not exceed one-half the steady bias voltage.

Similarly, it is important that during the negative half of the alternating voltage cycle the field in the space charge region not fall to a value where the carrier velocity depends markedly on the field, which in silicon corresponds to a value of below about $5\times10^3$ volts per centimeter. This can be avoided if the difference between the steady bias and the punch-through voltage is chosen to be at least $10^4$ volts/centimeter times the width of the space charge layer, and the condition set forth above for the maximum alternating voltage is observed.

To localize the multiplication, the field should remain well below the critical field except near the $N^+$ P junction 17. This can usually be realized readily if the steady voltage is made less than a few tenths the product of the critical field and the witdh of the space charge layer. Thus, this condition, together with the one previously described, imposes upper and lower limits on the steady voltage desirable for maximum efficiency of operation.

When the diode described is operated to provide a negative dynamic resistance, it will also exhibit a reactive component which is capacitive to the alternating voltage. In particular, the diode acts like a capacitance and a negative resistance in parallel and for circuit applications it can be so treated. The capacitance is determined primarily by the width of the space charge layer, as is known to workers in the art.

To make a resonant system, the diode is inserted in a circuit arrangement which has an inductive reactance which resonates with the capacitance of the diode at a frequency for which the transit time relationship set forth above for negative dynamic resistance is satisfied, i.e., the resonant frequency has a period which is twice the transit time.

In the applications of primary interest, a diode of the kind described is incorporated into a microwave cavity which is designed to act like an inductance in series with a resistance. The inductance of the cavity is chosen so that the diode and the cavity together have a resonant frequency whose period is twice the transit time and the resistance is made equal to the negative resistance of the diode so that the two resistances cancel, and the equivalent circuit consists of the capacitance of the diode and the inductance of the cavity, which forms an oscillating system.

Figure 5:
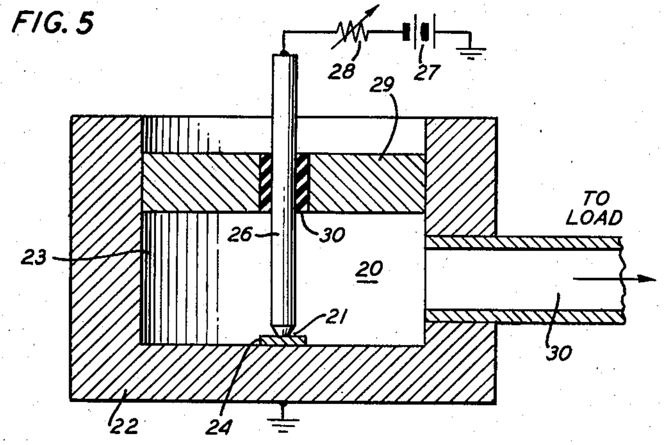
Figs. 5 and 6 each show an oscillator incorporating a diode of the kind shown in Fig. 1 for use as a dynamic negative resistance in accordance with the invention.

An oscillator employing a negative dynamic resistance unit as described above is shown in Fig. 5. It comprises a basic diode unit 20, such as that shown in Fig. 1, mounted with a major face of the semiconductive body 21 contacting wall 22 of tunable cavity 23 and making a low resistance connection 24 of high heat conductivity therewith. The cavity may be grounded. The second electrical connection is made to the semiconductor body on the major surface opposite the contact 24 by conductive element 26 which is connected to a suitable source of potential 27 arranged to bias the $N^+ - P$ junction in the body 21 in the reverse direction of conduction. A bias adjusting means such as a variable series resistance 28 is provided in the circuit to element 26. Element 26 is so arranged that the cavity is symmetrically disposed around it except for the output therefrom. The element is tapered at the end contacting the semiconductive diode to minimize the capacitance formed with the wall of the cavity. The cavity is provided with tuning means in the form of a plunger 29 electrically connected to the walls and arranged for movement along the axis of the cavity. An insulating bushing 30 is fitted into the plunger and journalled on the lead to isolate the lead from the cavity electrically and to permit axial movement of the plunger along the lead. The height of the plunger is adjusted so that cavity 23 functions as an inductance tuned with the capacitance of the diode as discussed. The output of the tuned combination constituting the oscillator is fed from the cavity 23 through a coupling connection 30 of suitable dimensions for the transmission of electromagnetic waves of the frequency generated by the oscillator to a suitable load (not shown).

In the oscillator described the frequency of oscillations can be tuned by adjustment of the tuning plunger 29 over the range of frequencies for which the transit time relationship necessary for a negative dynamic resistance is met. This can be more than fifty percent of the center frequency.

Additionally, it is possible to vary the output level by adjustment of the variable resistance 28. In particular, if the resistance element is a switch which is opened and closed with a prescribed repetition rate, pulsed operation of the oscillator results. Similarly, amplitude modulation of the output can be achieved by modulating the value of resistance 28 in accordance with modulating intelligence by suitable means (not here shown). Alternatively, amplitude modulation may be achieved by modulation of the level of the voltage source 27.

Figure 6:
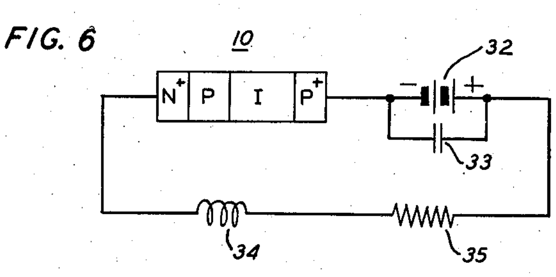

It is, of course, feasible to associate the diode with other arrangements of inductance and resistance to achieve an oscillating system. In particular, the diode may be associated with lumped circuit elements as shown in Fig. 6 to provide an oscillator for use at frequencies somewhat lower than microwaves, such as in the hundreds megacycles range. In this oscillator, the diode 20 is connected in series with the voltage source 32, the inductance element 34 and the load 35. A capacitor 33 is used to permit the alternating current to bypass the voltage source 32.

It is, of course, feasible to use the negative dynamic resistance in an amplifier in the manner known to workers in the art for this purpose. In such operation the diode is biased below the point at which self-oscillation results and thereafter there are applied input signals of frequencies within the band at which the diode serves as a negative dynamic resistance. For example, for use as an amplifier, the structure shown in Fig. 5 may be modified to include an input connection to the cavity for introducing therein signal power to be amplified. Alternatively, the single connection shown may be made to connect to one arm of a circulator, other arms of which connect to a load and an input source, whereby the single connection can serve simultaneously both as the input and the output connection in the manner known to workers in the art.

Various modifications are possible in the design of the semiconductive diode to be used to provide a negative dynamic resistance. For example, it is feasible to employ a $P^+$ N I $N^+$ structure in the same way as has been described for the $N^+$ P I $P^+$ structure after appropriate reversal of the polarity of the steady voltage source. Moreover, in either of these designs, the intermediate intrinsic zone may be replaced by a zone of extrinsic conductivity of either type so long as its doping is sufficiently light that the current generation is localized to one edge of the space charge layer.

Additionally, it is feasible to employ a structure in which the maximum field is localized at a region near the middle of a space charge region and the flow of charge carriers of each sign through the space charge region gives rise to a current in the external circuit. Typically, an $N^+$ I N P I $P^+$ structure may be used in this manner with the electrical breakdown localized at the N P junction. Such a structure should be designed so that the average transit time of the generated holes to the $P^+$ zone and the average transit time of the generated electrons to the $N^+$ zone each satisfy the relationships previously set forth for negative dynamic resistance.

Still further, it would be feasible to employ a structure which includes two heavily doped terminal zones of opposite conductivity type and an intermediate region in which there is a gradual transition from a predominance of acceptors to a predominance of donors. Such a structure, however, would be appreciably inferior to those described earlier because the width of the space charge region would not remain fixed during the entire alternating voltage cycle.

As was mentioned in the introduction, the invention contemplates the use of the internal field emission effect in addition to the internal secondary emission effect for the generation of the current pulse at the edge of the space charge layer. Internal field emission results at fields for which electrons tunnel from the valence to the conduction bands. The rate of generation is an extremely sensitive function of electric field; so, as in the case of internal secondary emission, the generation can be highly localized. The diode shown in Fig. 1 may be made to operate by internal field emission current if the P-type region 12 is made sufficiently narrow. The current generated at the edge of the space charge layer in this case will be a function of the instantaneous field, however, so that the alternating voltage and the current generated are in phase. This means the phase shift between the external current and the alternating voltage will arise solely from the transit time of the generated current. For ideal phase relations at relatively large amplitudes, the applied bias should be such that current is generated mainly in a short burst near the voltage peak. Then if the transit time is between one-half and one period of the alternating voltage, a negative dynamic resistance is possible. In particular, the negative dynamic resistance is a maximum if the transit time is three-quarters of the period of the alternating voltage. For internal field emission, the combined magnitude of the applied bias and the superposed alternating voltage should be sufficient to produce at the point of emission a field greater than about $10^5\ (Eg/0.7)^{3/2}$ volts per centimeter where Eg is the energy gap of the semiconductive material. A diode utilizing internal field emission may be used in the various applications described for the diode utilizing internal secondary emission.

It is to be understood that the specific embodiments which have been described are merely illustrative of the general principles of the invention. Various other arrangements may be devised by one skilled in the art without departing from the spirit and scope of the invention. For example, a diode of the kind described may be utilized to insert negative resistance in a wave guide through which is propagating signal energy of appropriate frequency in the manner described in copending application Serial No. 516,691, filed June 20, 1955, by G. Weinreich.

What is claimed is:

1. A negative dynamic resistance arrangement comprising a semiconductive body including a pair of end zones of opposite conductivity type and intermediate therebetween a space charge region which includes a first portion which is contiguous to one of the end zones and is of conductivity type opposite that of said one terminal zone and a second portion which is contiguous to the other of the end zones and has a specific resistivity higher than said other terminal zone, a separate electrode connected to each of the two end zones, means for applying a steady potential difference between the two electrodes for establishing a space charge in said region, and means for impressing on said steady potential difference an alternating component of magnitude to provide in said first portion of the space charge region an electric field of strength suited for the breakdown generation at a periodic rate of hole-electron pairs, the period of said rate and the width of the space charge region being so correlated that a negative dynamic resistance is established between the two electrodes.

2. A negative dynamic resistance arrangement comprising a semiconductive body including a pair of end zones of opposite conductivity type and intermediate therebetween a space charge region which includes a first portion which is contiguous to one of the end zones and is of conductivity type opposite that of said one terminal zone and a second portion which is contiguous to the other of the end zones and is substantially intrinsic, a separate electrode connected to each of the two end zones, means for applying a steady potential difference between the two electrodes, means for impressing on said potential difference an alternating component such that the resultant potential difference establishes in said first portion of the space charge region an electric field periodically of strength sufficient for the breakdown generation of hole-electron pairs, the period of said alternating component and the width of the space charge region being so correlated that a negative dynamic resistance is established between the two electrodes.

3. In combination, a semiconductive body including a pair of end zones of opposite conductivity type and intermediate therebetween a space charge region which includes a first portion which is contiguous to one of the end zones and is of the conductivity type opposite that of said one end zone and a second portion which is contiguous to the other of the end zones and has a specific resistivity higher than said other end zone, a separate electrode connected to each of the two end zones, means for applying a steady potential difference between the two electrodes for establishing in said space charge region an electric field of strength about sufficient for the breakdown generation of hole-electron pairs, and inductive means connected between the two electrodes, said inductive means and the semiconductive body being resonant at a frequency whose period is so correlated with the average transit time across the space charge region of carriers of the kind in the minority in said first portion of the space charge region that a negative dynamic resistance is established between the two electrodes.

4. A microwave oscillator comprising a resonant cavity which has a pair of opposite wall portions which are isolated from one another for direct currents, and a semiconductive element positined between said wall portions, said element comprising a pair of end zones of opposite conductivity type and an intermediate region including a first portion which is contiguous to one of the end zones and is of conductivity type opposite that of said one end zone and the second portion which is contiguous to the other of the end zones and has a specific resistivity higher than said other end zone, and each terminal zone making a low resistance connection to a different one of said wall portions.

5. A negative dynamic resistance arrangement comprising a semiconductive body having end regions which are of opposite conductivity type and intermediate therebetween a space charge region which includes a portion where the conductivity changes from one type to the opposite type, electrode connections to said end regions, and means for applying to said electrode connections a steady voltage and superimposed thereon an alternating voltage of magnitude such that periodically the electric field at said portion of the space charge region reaches a value sufficient for the breakdown generation of hole-electron pairs, the period of said alternating component and the transit time of the generated carriers through the charge region being so correlated that a negative dynamic resistance is established between the two electrodes.

References Cited in the file of this patent

UNITED STATES PATENTS

| | | |
|---|---|---|
| 2,190,668 | Llewellyn | Feb. 20, 1940 |
| 2,767,358 | Early | Oct. 16, 1956 |
| 2,790,037 | Shockley | Apr. 23, 1957 |

FOREIGN PATENTS

| | | |
|---|---|---|
| 158,879 | Australia | Dec. 4, 1952 |
| 1,129,061 | France | Jan. 15, 1957 |

OTHER REFERENCES

Articles by Lossev, "Oscillating Crystals," Wireless World & Radio Review, October 22, 1924, pages 93–96.